United States Patent
Mohammad et al.

(10) Patent No.: US 12,524,085 B1
(45) Date of Patent: Jan. 13, 2026

(54) HOT-SWAPPABLE BATTERY SYSTEM FOR COMPUTER PERIPHERALS

(71) Applicant: Glorious LLC, Austin, TX (US)

(72) Inventors: Shazim Mohammad, Fairview, TX (US); Shariq Mohammad, McKinney, TX (US); Matthew Windt, Austin, TX (US); Sanjaya Bhanu Dissanayake, Taoyuan (TW)

(73) Assignee: Glorius LLC, Austin, TX (US)

( * ) Notice: Subject to any disclaimer, the term of this patent is extended or adjusted under 35 U.S.C. 154(b) by 0 days.

(21) Appl. No.: 19/269,402

(22) Filed: Jul. 15, 2025

Related U.S. Application Data

(60) Provisional application No. 63/771,180, filed on Mar. 13, 2025.

(51) Int. Cl.
  *G06F 3/0354* (2013.01)
  *G06F 1/3234* (2019.01)
  *G06F 3/038* (2013.01)

(52) U.S. Cl.
  CPC ........ *G06F 3/03543* (2013.01); *G06F 3/0383* (2013.01); *G06F 1/3259* (2013.01); *G06F 2203/0384* (2013.01)

(58) Field of Classification Search
  CPC ... G06F 1/3259; G06F 3/03543–03544; G06F 3/038–0383
  See application file for complete search history.

(56) References Cited

U.S. PATENT DOCUMENTS

| | | | |
|---|---|---|---|
| 6,476,795 B1* | 11/2002 | Derocher | G06F 1/1616 345/157 |
| 11,966,521 B2* | 4/2024 | Gwee | G06F 3/03543 |
| 12,212,014 B2* | 1/2025 | Lu | H01M 10/4257 |
| 2009/0009475 A1* | 1/2009 | Schuette | G06F 3/03543 345/163 |
| 2010/0265179 A1* | 10/2010 | Ram | G06F 3/0227 345/163 |
| 2010/0328213 A1* | 12/2010 | Lin | G06F 3/03543 345/163 |
| 2022/0149470 A1* | 5/2022 | Lu | H01M 50/264 |
| 2024/0045516 A1* | 2/2024 | Gwee | G06F 3/03543 |
| 2024/0113561 A1* | 4/2024 | Plancherel | G06F 3/03543 |
| 2025/0093975 A1* | 3/2025 | Gu | H01M 50/247 |

* cited by examiner

*Primary Examiner* — Patrick F Marinelli
(74) *Attorney, Agent, or Firm* — Scale LLP

(57) ABSTRACT

A hot-swappable battery system for computer peripherals includes a wireless mouse having a battery compartment, a battery connector assembly mounted within the battery compartment, a removable battery configured to be inserted into and ejected from the battery connector assembly, a keep-alive battery mounted within the wireless mouse, and a docking station. The battery connector assembly includes electrical contacts and a push-push ejector mechanism. The keep-alive battery is electrically connected to provide backup power when the removable battery is removed. The docking station has a battery slot configured to receive and charge the removable battery when not in use in the wireless mouse. The system enables continuous operation of the wireless mouse while battery swapping between the mouse and docking station.

18 Claims, 7 Drawing Sheets

HOT-SWAPPABLE BATTERY SYSTEM FOR COMPUTER PERIPHERALS

CROSS-REFERENCE TO RELATED APPLICATIONS

This application claims priority to U.S. Provisional Application No. 63/771,180, titled Hot-Swappable Mouse Battery System, filed Mar. 13, 2025, which is hereby incorporated by reference in its entirety.

FIELD OF INVENTION

The present disclosure relates to battery systems for computer peripherals, and more particularly to a hot-swappable battery system for wireless computer mice featuring a universal connector design and integrated power management.

BACKGROUND

Wireless computer peripherals, such as mice, have become increasingly popular due to their convenience and flexibility. These devices typically rely on rechargeable batteries to provide power for operation. However, traditional battery systems for wireless peripherals often require users to pause their work or gaming sessions when the battery is depleted, either to replace disposable batteries (such as AA or AAA batteries) or to connect a charging cable, which effectively removes the "wireless" capability while the device is charging.

The management of power in wireless peripherals presents several challenges. Users may experience interruptions in their workflow or gameplay when the battery runs low or dies completely, necessitating a switch to a wired connection or a period of downtime while the batteries are swapped or the device recharges. This can be particularly disruptive in professional or competitive gaming environments where continuous, uninterrupted use is desired.

Additionally, the lifespan of rechargeable batteries in wireless peripherals is limited, and their capacity tends to degrade over time with repeated charge cycles. This degradation can lead to decreased battery life and potentially require replacement of the entire device if the battery is not user-replaceable.

Furthermore, different users have varying needs in terms of battery life and device weight. Some may prioritize extended battery life for long gaming sessions or workdays, while others may prefer a lighter device for improved maneuverability, especially in fast-paced gaming scenarios. For many users, particularly those engaged in competitive gaming or time-sensitive tasks, any interruption in mouse functionality can be problematic. Gamers, for instance, often require continuous, uninterrupted use of their input devices during extended gaming sessions. Even brief periods of unavailability can negatively impact performance or enjoyment.

Existing wireless peripheral designs often struggle to balance these competing priorities. Devices with larger batteries for extended use tend to be heavier, while lighter devices may sacrifice battery life. This trade-off can limit the versatility and appeal of wireless peripherals for users with diverse preferences and use cases.

The integration of power management systems in wireless peripherals also presents technical challenges. These systems must efficiently handle power distribution, monitor battery levels, and manage the transition between different power states without introducing latency or affecting device performance.

As the demand for wireless peripherals continues to grow, there is an ongoing need for innovative solutions that can address these challenges and enhance the user experience. Improvements in battery technology, power management, and device design have the potential to overcome current limitations and provide users with more flexible, efficient, and customizable wireless peripheral options.

SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

According to an aspect of the present disclosure, a hot-swappable battery system for a wireless mouse is provided. The system includes a wireless mouse having a battery compartment. The system includes a battery connector assembly mounted within the battery compartment, the battery connector assembly including electrical contacts and a push-push ejector mechanism. The system includes a removable battery configured to be inserted into and ejected from the battery connector assembly. The system includes a keep-alive battery mounted within the wireless mouse and electrically connected to provide backup power when the removable battery is removed or depleted. The system includes a docking station having a battery slot configured to receive and charge the removable battery when not in use in the wireless mouse.

According to other aspects of the present disclosure, the hot-swappable battery system may include one or more of the following features. The battery connector assembly may further comprise a plurality of structural ribs and a plurality of support elements, wherein the plurality of support elements are positioned along sides of the opening of the assembly and secure the removable battery when inserted into the assembly. The keep-alive battery may maintain fully functioning and uninterrupted operation of the wireless mouse when the removable battery is removed or depleted. The removable battery may be configured to recharge the keep-alive battery when inserted into the battery compartment.

The wireless mouse may include a power management system configured to: preserve charge of the keep-alive battery when the removable battery is inserted and providing power; and automatically switch to drawing power from the keep-alive battery when the removable battery is removed or when a charge level of the removable battery falls below a predetermined threshold. The connector assembly may be configured to accommodate removable batteries of different capacities. The docking station may further comprise one or more I/O ports. The wireless mouse may further comprise a wired communication interface, and the wired communication interface may be configured to be connected to the one or more I/O ports of the docking station. When the wireless mouse is connected to the one or more I/O ports of the docking station via the wired communication interface, power may be supplied through the wired connection to charge one or both of the removable battery and the keep-alive battery. The docking station may further comprise a plurality of indicator lights positioned on a top surface to display status information.

According to another aspect of the present disclosure, a method for using a hot-swappable battery system is provided. The method includes providing a wireless mouse with a battery compartment and a battery connector assembly mounted within the battery compartment. The method includes inserting a removable battery into the battery connector assembly of the wireless mouse. The method includes operating the wireless mouse using power from the removable battery. The method includes monitoring a charge level of the removable battery. The method includes removing the removable battery from the wireless mouse while maintaining operation of the wireless mouse using power from a keep-alive battery mounted within the wireless mouse. The method includes inserting the removed battery into a battery slot of a docking station. The method includes charging the removed battery in the docking station. The method includes inserting a second removable battery from the docking station into the battery connector assembly of the wireless mouse. The method includes resuming operation of the wireless mouse using power from the second removable battery.

According to other aspects of the present disclosure, the method may include one or more of the following features. The battery connector assembly may include a push-push ejector mechanism, and removing the removable battery may comprise actuating the push-push ejector mechanism. The method may further comprise: preserving charge of the keep-alive battery when the removable battery is inserted and providing power to the wireless mouse; and automatically switching to drawing power from the keep-alive battery when the removable battery is removed or when a charge level of the removable battery falls below a predetermined threshold. The method may further comprise recharging the keep-alive battery using power from the removable battery when the removable battery is inserted into the battery connector assembly.

The docking station may include a plurality of indicator lights, and the method may further comprise displaying status information related to the charging of at least one of the removed battery, the second removable battery, and the keep-alive battery using the indicator lights. The method may further comprise connecting the wireless mouse to the docking station via a wired communication interface. The method may further comprise charging one or both of the removable battery and the keep-alive battery through the wired communication interface when the wireless mouse is connected to the docking station. The battery connector assembly may be configured to accommodate removable batteries of different capacities, and the second removable battery may have a different capacity than the removed battery. The method may further comprise securing the removable battery within the battery connector assembly using a plurality of support elements positioned along sides of an opening of the assembly. The docking station may include multiple battery slots, and the method may further comprise: charging multiple removable batteries simultaneously in the docking station; and displaying charge status for each battery using the indicator lights.

The foregoing general description of the illustrative embodiments and the following detailed description thereof are merely exemplary aspects of the teachings of this disclosure and are not restrictive.

BRIEF DESCRIPTION OF FIGURES

Non-limiting and non-exhaustive examples are described with reference to the following figures.

DETAILED DESCRIPTION

The following description sets forth exemplary aspects of the present disclosure. It should be recognized, however, that such description is not intended as a limitation on the scope of the present disclosure. Rather, the description also encompasses combinations and modifications to those exemplary aspects described herein.

The present disclosure relates to a hot-swappable battery system for wireless computer mice. This system may provide continuous operation of a wireless mouse by allowing batteries to be exchanged without interrupting mouse functionality. The system may include a wireless mouse with a battery compartment, one or more removable batteries, a battery connector assembly, and a keep-alive battery. A docking station may also be included for charging and storing batteries when not in use in the mouse.

In some cases, the battery connector assembly may be mounted within the battery compartment of the wireless mouse. The battery connector assembly may include electrical contacts for power transfer and a mechanism for smooth insertion and ejection of batteries. The keep-alive battery may be permanently installed within the wireless mouse to maintain operation when a removable battery is depleted or removed.

The system may incorporate a power management scheme to efficiently utilize the removable and keep-alive batteries. This scheme may preserve the charge of the keep-alive battery when a removable battery is providing power, and automatically switch power sources as needed.

The docking station may feature one or more slots for charging removable batteries. In some cases, the docking station may include indicator lights to display charging status and other information. The docking station may also incorporate input/output ports for connectivity with the wireless mouse or other devices.

This hot-swappable battery system may allow users to maintain uninterrupted use of their wireless mouse by swapping batteries as needed, potentially improving productivity in various computing environments.

Figure 1:
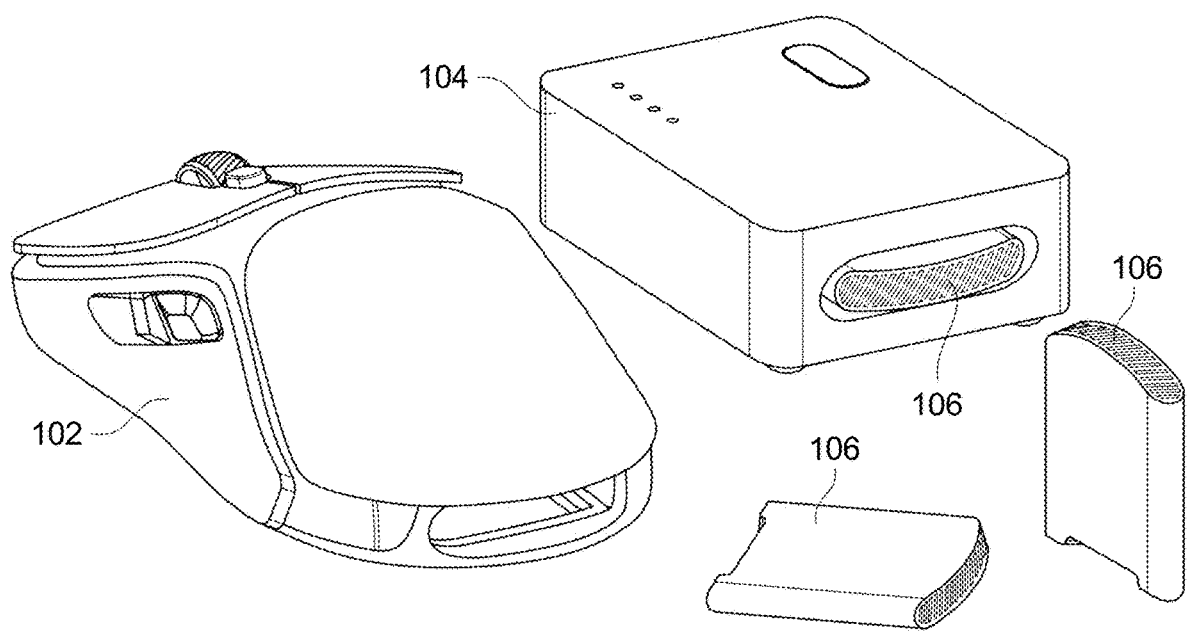
FIG. 1 illustrates a perspective view of a hot-swappable wireless mouse battery system, according to aspects of the present disclosure.

FIG. 1 illustrates a perspective view of a hot-swappable wireless mouse battery system 100. The hot-swappable wireless mouse battery system 100 may include a wireless mouse 102, a docking station 104, and one or more batteries 106.

The wireless mouse 102 may include a battery compartment configured to receive one of the batteries 106. In some cases, the battery compartment may house a battery connector assembly. The battery connector assembly may include electrical contacts for power transfer and a push-push ejector mechanism for smooth insertion and removal of the batteries 106.

The batteries 106 may be removable and configured to be inserted into and ejected from the battery connector assembly within the wireless mouse 102. In some cases, the wireless mouse 102 may also include a keep-alive battery mounted within the wireless mouse 102. The keep-alive battery may provide backup power when one of the removable batteries 106 is removed or depleted.

The docking station 104 may include one or more battery slots configured to receive and charge the batteries 106 when not in use in the wireless mouse 102. This configuration may allow for continuous operation of the wireless mouse 102 by enabling users to swap between charged and depleted batteries.

The hot-swappable wireless mouse battery system 100 may enable uninterrupted use of the wireless mouse 102 through the interchangeability of the batteries 106 between the wireless mouse 102 and the docking station 104. When a battery 106 in use in the wireless mouse 102 becomes depleted, a user may remove the depleted battery 106 and insert a charged battery 106 from the docking station 104. The depleted battery 106 may then be placed in the docking station 104 for charging, creating a cycle of battery usage and charging that supports continuous operation of the wireless mouse 102.

Figure 2A:
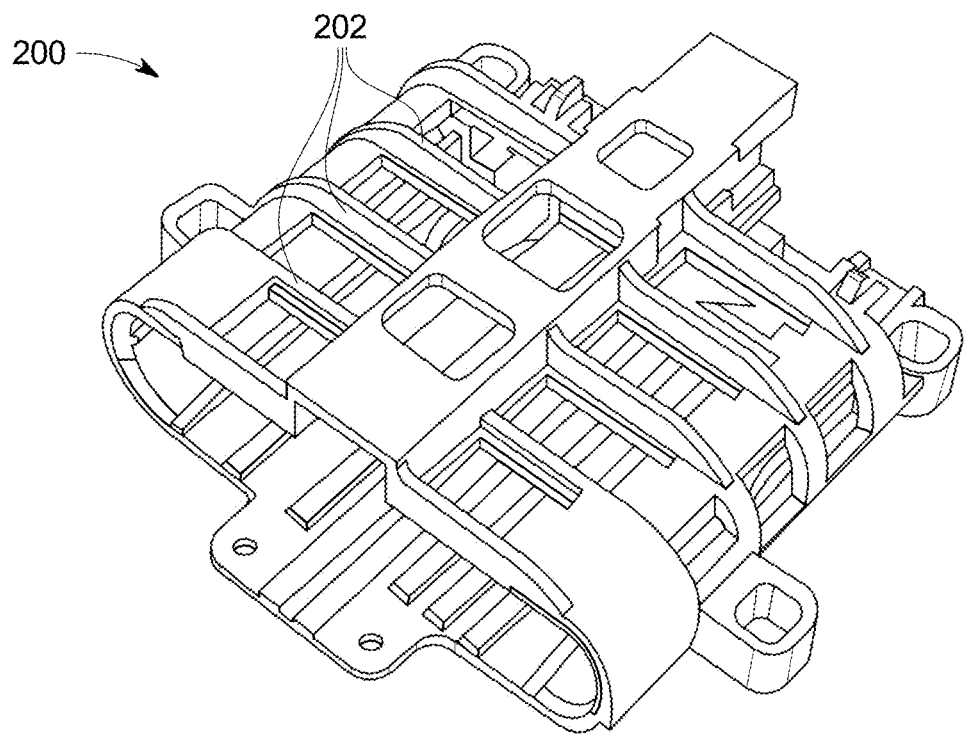
FIG. 2A illustrates a perspective view of a battery connector assembly, according to an embodiment.

FIG. 2A illustrates a perspective view of a battery connector assembly 200. The battery connector assembly 200 may include a plurality of structural ribs 202 that extend along the sides of the assembly. The structural ribs 202 may be arranged in a parallel configuration and provide support for the battery connector assembly 200. In some cases, the battery connector assembly 200 may have a generally rectangular shape with openings and channels integrated into its design. The structural ribs 202 may be formed as part of the housing of the battery connector assembly 200 and help maintain the structural integrity of the assembly while allowing for proper battery insertion and removal.

Figure 2B:
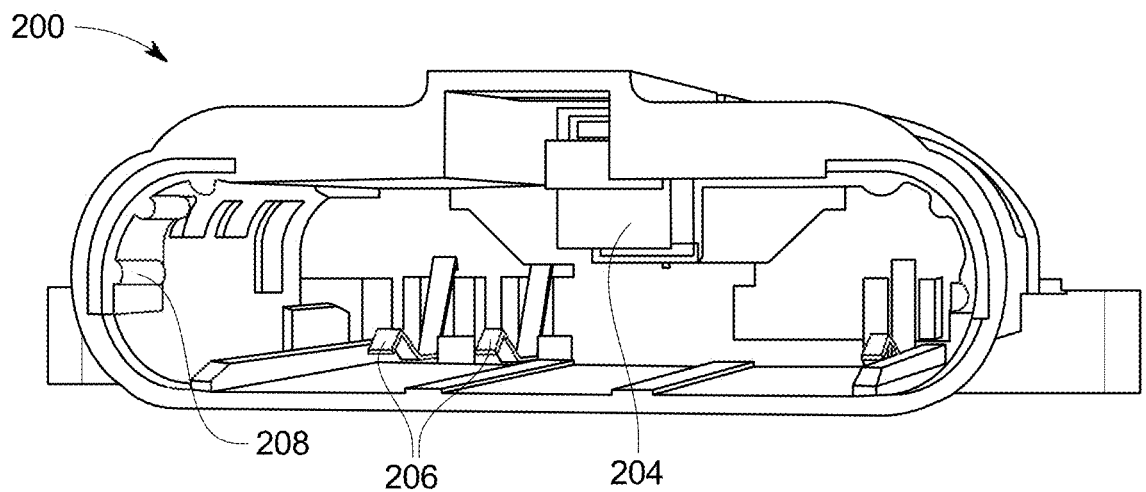
FIG. 2B illustrates another perspective view of the battery connector assembly of FIG. 2A, according to aspects of the present disclosure.

FIG. 2B illustrates a side perspective view of the battery connector assembly 200. The battery connector assembly 200 may include one or more electrical contacts 206 positioned within the assembly to establish electrical connection with a battery. The electrical contacts 206 may be arranged to maintain consistent electrical connection when a battery is installed. A push-push ejector mechanism 204 may be integrated into the assembly to facilitate battery insertion and removal. The push-push ejector mechanism 204 may enable smooth insertion and ejection of batteries through a mechanical pushing action.

The battery connector assembly 200 may be designed to accommodate batteries of varying capacities. In some aspects, the assembly may support a range of battery sizes without requiring significant modifications to the connector structure itself.

For instance, a higher capacity battery may simply extend further out from the opening of the battery slot when inserted, while still maintaining proper electrical contact and secure positioning within the assembly. This flexible design approach may allow users to choose between different battery capacities based on their specific needs. For example, a user prioritizing extended use time may opt for a higher capacity battery that protrudes slightly more from the mouse body, while a user focusing on minimal weight and maximum maneuverability may select a lower capacity option that sits more flush with the device.

In some embodiments, the battery connector assembly 200 may accommodate batteries with different capacities, such as 200 mAh and 500 mAh. These batteries may have the same form factor, allowing them to fit within the same connector assembly, but may differ in weight. For example, a 200 mAh battery may weigh about 7 g, while a 500 mAh battery may weigh about 11 g. This flexibility in battery support may allow users to choose between lighter weight options for improved maneuverability or higher capacity options for extended use time, depending on their specific needs and preferences.

The push-push ejector mechanism 204 and electrical contacts 206 may be positioned within the battery connector assembly 200 in a way that ensures proper functionality across this range of battery sizes. This versatility in battery support may enhance the overall adaptability of the hot-swappable battery system, allowing it to cater to diverse user preferences and usage scenarios without necessitating multiple connector designs.

The battery connector assembly 200 may be constructed from a variety of materials, including different types of plastics and metals. In some cases, the assembly may utilize a combination of materials to optimize performance, durability, and cost-effectiveness.

Plastics such as acrylonitrile butadiene styrene (ABS), polycarbonate, or high-density polyethylene (HDPE) may be used for the main body of the battery connector assembly 200. These materials may provide a balance of strength, flexibility, and electrical insulation properties. In some aspects, glass-filled nylon or other reinforced polymers may be employed to enhance the structural integrity of components like the structural ribs 202.

For components requiring higher strength or conductivity, metals may be incorporated into the design. For example, the electrical contacts 206 may be made from conductive metals such as copper, brass, or gold-plated alloys to ensure reliable electrical connections. In some cases, aluminum or stainless steel elements may be used for reinforcement or to create precision components within the push-push ejector mechanism 204.

The choice of materials may vary depending on factors such as the specific design requirements, manufacturing processes, and intended use environment of the battery connector assembly 200. In some implementations, advanced composites or specialty alloys may be utilized to meet particular performance criteria or to address specific challenges related to heat dissipation, wear resistance, or electromagnetic shielding.

The assembly may include supports 208 positioned along the sides of the opening to provide a secure fit and stability to inserted batteries. These supports 208 may help maintain proper alignment and stability of the battery within the assembly. In some cases, the supports 208 may be made from materials that are more flexible than the rest of the battery connector assembly 200 to improve the ease of insertion and removal while also ensuring that an inserted battery does not wiggle or rattle within the battery connector assembly 200. In embodiments, the supports 208 may be comprised of a silicone rubber. Other suitable flexible materials may include thermoplastic elastomers (TPE), thermoplastic polyurethane (TPU), ethylene-vinyl acetate (EVA)

foam, polyurethane foam, neoprene, natural rubber, styrene-butadiene rubber (SBR), or various elastomeric compounds with different durometer ratings. These materials may be selected based on their compression set resistance, temperature stability, and ability to maintain their elastic properties over time. The use of flexible materials may accommodate potential battery swelling across different battery capacities while providing sufficient compression resistance to maintain proper contact pressure. Some embodiments may utilize composite materials that combine rigid structural elements with flexible contact surfaces to optimize both stability and adaptability to battery dimensional changes during charging cycles and temperature fluctuations.

The battery connector assembly 200 may be specifically engineered to withstand various environmental and usage conditions. In some cases, the assembly may be designed to maintain integrity during drop testing, prevent battery rattle during aggressive mouse movements, and maintain function when external forces are applied to the wireless mouse body.

The battery connector assembly 200 and the batteries may be designed to maintain the battery parallel to the mouse surface. This configuration may optimize the center of mass within the wireless mouse and prevent a bottom-heavy feel during use. The parallel orientation may contribute to improved balance and ergonomics of the wireless mouse.

The battery connector assembly 200 may feature a modular design that allows for integration into a variety of peripheral devices. This modular approach may enable the assembly to be easily incorporated not only into the wireless mouse and docking station described in more detail below, but also into other peripherals such as keyboards, headsets, microphones, cameras, speakers, and similar devices. The versatility of the battery connector assembly 200 may allow manufacturers to standardize battery connectivity across multiple product lines, potentially reducing development costs and improving compatibility between different devices. In some cases, the modular design may include standardized mounting points or interfaces that facilitate quick integration into various device housings. This flexibility may enable the hot-swappable battery system to be adapted for use in a wide range of electronic peripherals, expanding its utility beyond just mouse applications.

Figure 3A:
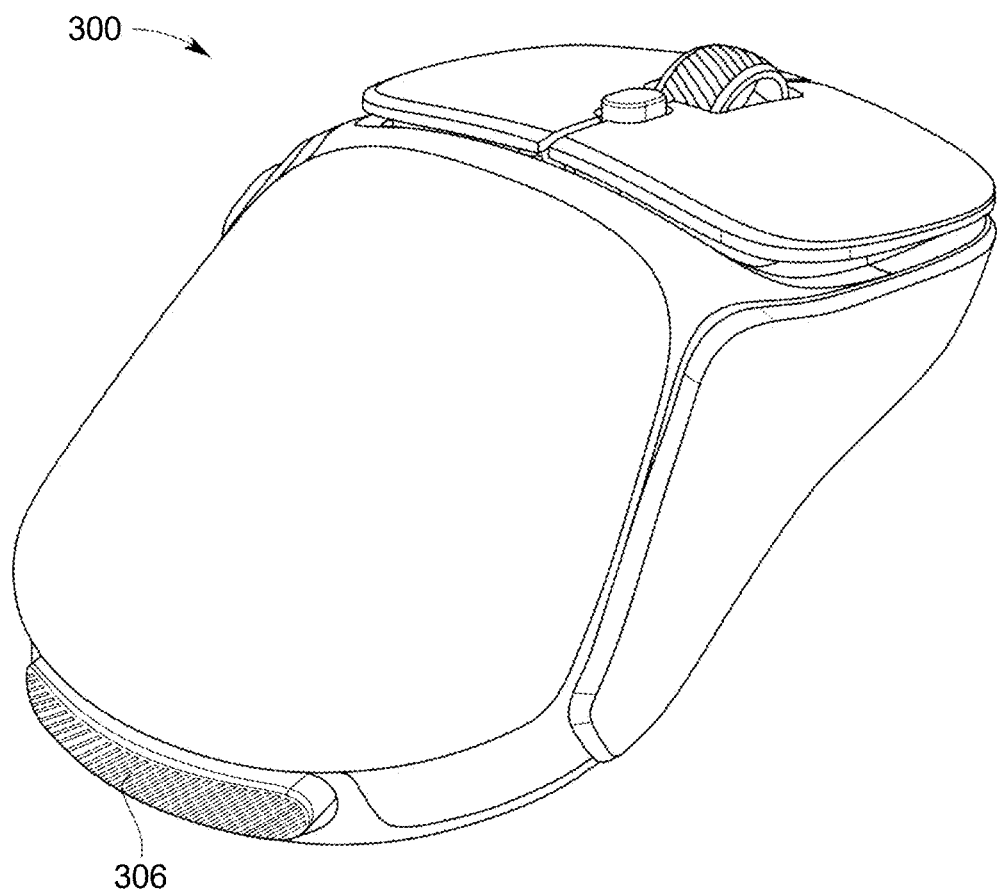
FIG. 3A illustrates a perspective view of a wireless mouse with a removable battery, according to an embodiment.

FIG. 3A illustrates a perspective view of a wireless mouse 300 as a component of the hot-swappable wireless mouse battery system 100. The wireless mouse 300 may include a battery 306 that can be inserted into and removed from the mouse housing. The battery 306 may be configured to slide smoothly into a battery compartment within the wireless mouse 300. In some cases, the battery 306 may feature contact points that align with corresponding electrical connections inside the wireless mouse 300 when fully inserted. The design of the wireless mouse 300 may allow for the battery 306 to be removed and replaced while maintaining the aesthetic and ergonomic profile of the wireless mouse 300.

Figure 3B:
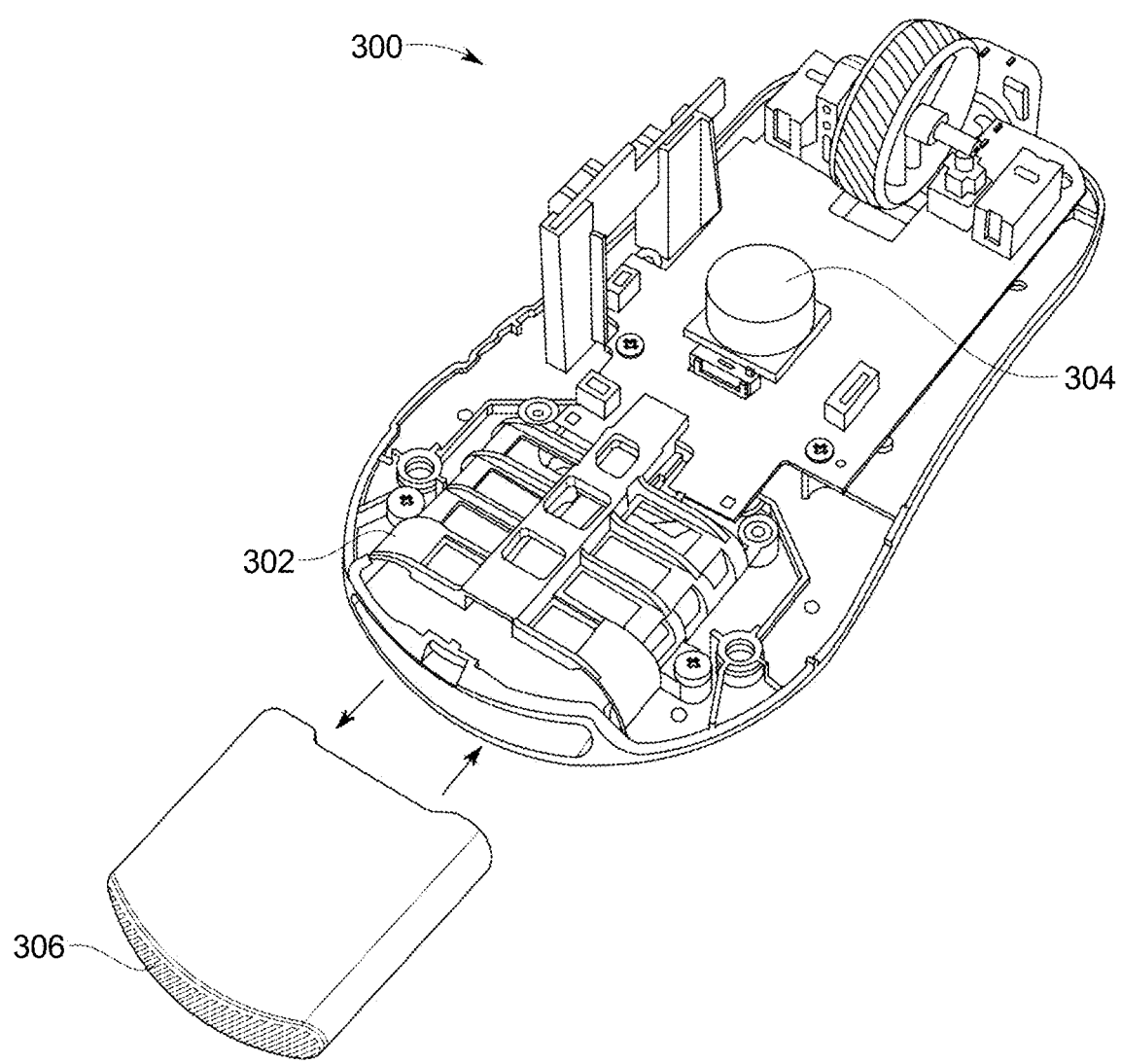
FIG. 3B illustrates a perspective view of an internal portion of the wireless mouse of FIG. 3A, according to aspects of the present disclosure.

FIG. 3B illustrates a perspective view of an internal portion of the wireless mouse 300, showing the integration of a battery system. The wireless mouse 300 may include a battery connector assembly 302 mounted to the mouse housing. A keep-alive battery 304 may be positioned on a printed circuit board (PCB), providing backup power functionality. The battery 306 may be designed to be inserted into the battery connector assembly 302.

The battery connector assembly 302 may include electrical contacts and mechanical features that enable secure connection with the battery 306. In some cases, the battery connector assembly 302 may be positioned to allow the battery 306 to be inserted and removed through an opening in the housing of the wireless mouse 300 while maintaining proper weight distribution and balance.

The keep-alive battery 304 may be permanently installed and allow the wireless mouse 300 to maintain operation when the battery 306 is removed or depleted. In some cases, the keep-alive battery 304 may have a capacity of at least 55 mAh. This capacity may be sufficient to maintain fully functioning and uninterrupted operation of the wireless mouse 300 when the battery 306 is removed or depleted.

The wireless mouse 300 may include a power management system. In some cases, the power management system may be configured to preserve the charge of the keep-alive battery 304 when the battery 306 is inserted and providing power. The power management system may automatically switch to drawing power from the keep-alive battery 304 when the battery 306 is removed or when a charge level of the battery 306 falls below a predetermined threshold. The power management system may be implemented through various means, including dedicated hardware circuitry, firmware, software, or combinations thereof. In hardware implementations, the system may utilize a power management integrated circuit (PMIC) that includes voltage regulators, battery charging controllers, and power path management circuitry. This circuitry may include comparators that monitor battery voltage levels and solid-state switches that seamlessly transition between power sources. The firmware implementation may include microcontroller programming that continuously monitors battery status through analog-to-digital converters and executes power source switching algorithms based on predefined thresholds and conditions. Software components may provide additional configuration options through a graphical user interface accessible via companion software on a connected computer, allowing users to customize power transition thresholds, view detailed battery statistics, and set preferences for power management behavior. For example, users may configure the system to prioritize performance or battery life, adjust the threshold at which power source switching occurs, or set custom power profiles for different usage scenarios. The power management system may also include communication protocols that enable status reporting to the operating system, providing users with real-time battery information through standard system interfaces.

In some cases, the battery 306 may be configured to recharge the keep-alive battery 304 when inserted into the battery compartment. This configuration may help ensure that the keep-alive battery 304 maintains sufficient charge to power the wireless mouse 300 during battery swaps or when the battery 306 is depleted.

The wireless mouse 300 may include a wired communication interface. In some cases, the wired communication interface may be configured to connect to the I/O ports of the docking station 104. When connected via the wired communication interface, power may be supplied to charge one or both of the battery 306 and the keep-alive battery 304. The wired communication interface may be implemented using Universal Serial Bus (USB) technology, such as USB-C or USB-A, which is capable of simultaneously handling both power delivery and data transmission requirements. This dual functionality allows the mouse to charge its batteries while also maintaining full operational capabilities, including firmware updates, configuration changes, and high-precision tracking. The wired communication interface can be implemented via an accessible port on the exterior of the wireless mouse 300, such as on the front face of the mouse. This positioning allows users to easily connect a cable when needed while maintaining ergonomic comfort during use. The port may be protected by a small cover or designed with a recessed profile to maintain the aesthetic integrity of the mouse while ensuring accessibility. The USB interface may support various power delivery profiles to optimize charging efficiency based on the specific power requirements of the battery 306 and keep-alive battery 304, while also providing sufficient bandwidth for data communication between the mouse and the host computer system through the docking station 104.

Figure 4A:
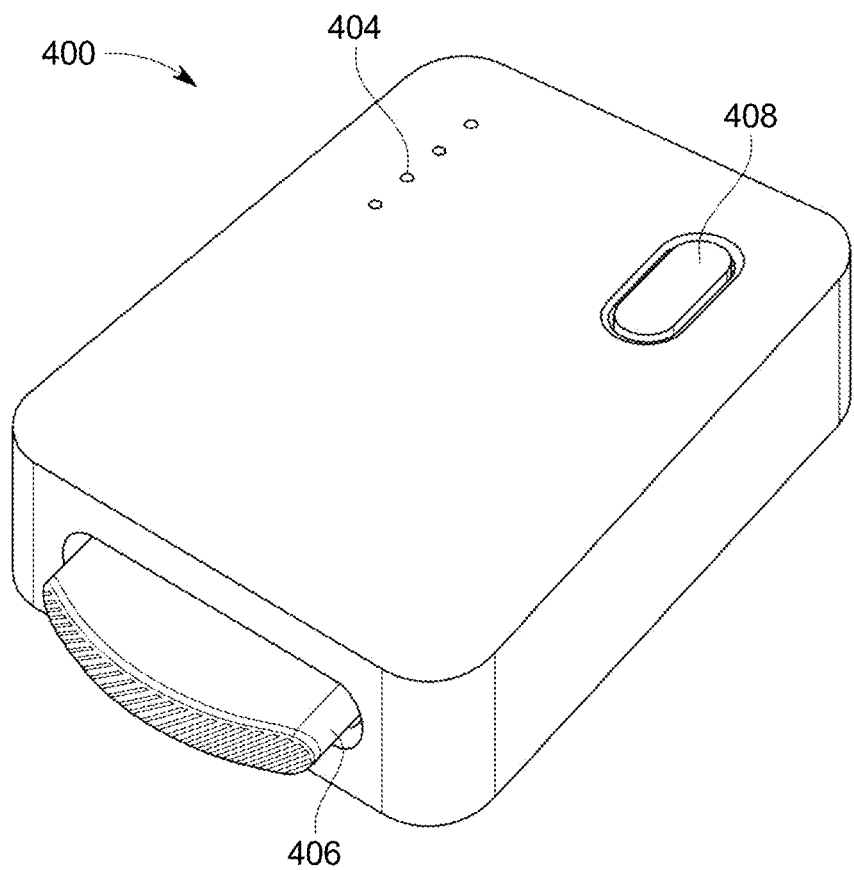
FIG. 4A illustrates a perspective view of a docking station, according to an embodiment.

FIG. 4A illustrates a perspective view of a docking station 400. The docking station 400 may include a housing with indicator lights 404 positioned on a top surface to display various status information. A button 408 may be integrated into the housing, allowing for multi-function user input. The docking station 400 may include a battery slot configured to receive a battery 406. The battery 406 may be inserted into and removed from the docking station 400 through the battery slot.

The indicator lights 404 may provide visual feedback about various parameters such as battery charging status, connection status, and system settings. In some cases, the indicator lights 404 may display information related to mouse battery level, base battery charging, polling rate, and DPI (dots per inch) settings. This configuration may allow users to quickly assess the status of various components of the hot-swappable wireless mouse battery system 100 at a glance.

The button 408 may be positioned for easy access and may be used to control different functions of the docking station 400. In some cases, the button 408 may be customizable, with default functions for DPI change and polling rate change. The customizable nature of the button 408 may allow users to tailor the functionality of the docking station 400 to their specific needs or preferences. Users may configure the button's functionality through a graphical user interface provided in a companion application software. This companion app may allow users to assign various functions to the button 408, such as switching between different device profiles, toggling power-saving modes, or initiating firmware updates. The graphical user interface may provide visual feedback about the current button assignment and allow users to create and save multiple configuration profiles for different usage scenarios. The companion app may be available for various operating systems, enabling broad compatibility across different computing platforms while maintaining a consistent user experience for button customization.

Figure 4B:
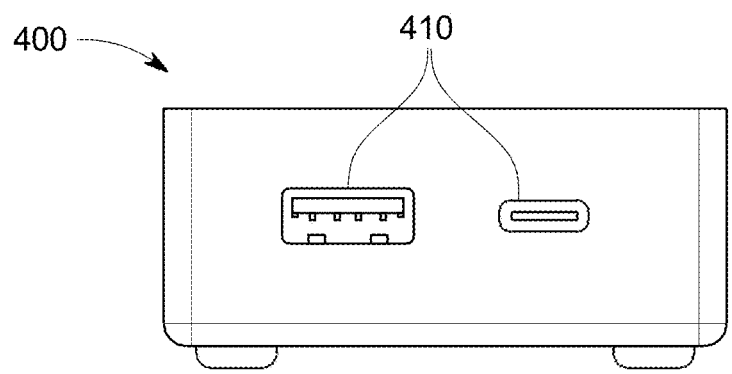
FIG. 4B illustrates a rear perspective view of the docking station of FIG. 4A, according to aspects of the present disclosure.

FIG. 4B illustrates a rear perspective view of the docking station 400. The docking station 400 may include I/O ports 410 positioned on the rear surface of the device. The I/O ports 410 may include a USB-C port for power input and a USB-A port that can accommodate a wireless dongle. One of the I/O ports 410 (e.g., the USB-C port) can be used to connect the docking station 400 directly to a computer or other device being controlled by the wireless mouse 102, enabling the docking station to serve as both a charging hub and a communication interface between the mouse and the controlled device. This connection allows for data transmission between the wireless mouse 102 and the computer, facilitating firmware updates, configuration changes, and standard mouse input functionality. In some cases, when the wireless mouse 102 is connected to the I/O ports 410 via a wired communication interface, power may be supplied through the wired connection to charge one or both of the removable battery 106 and the keep-alive battery 304.

Figure 4C:
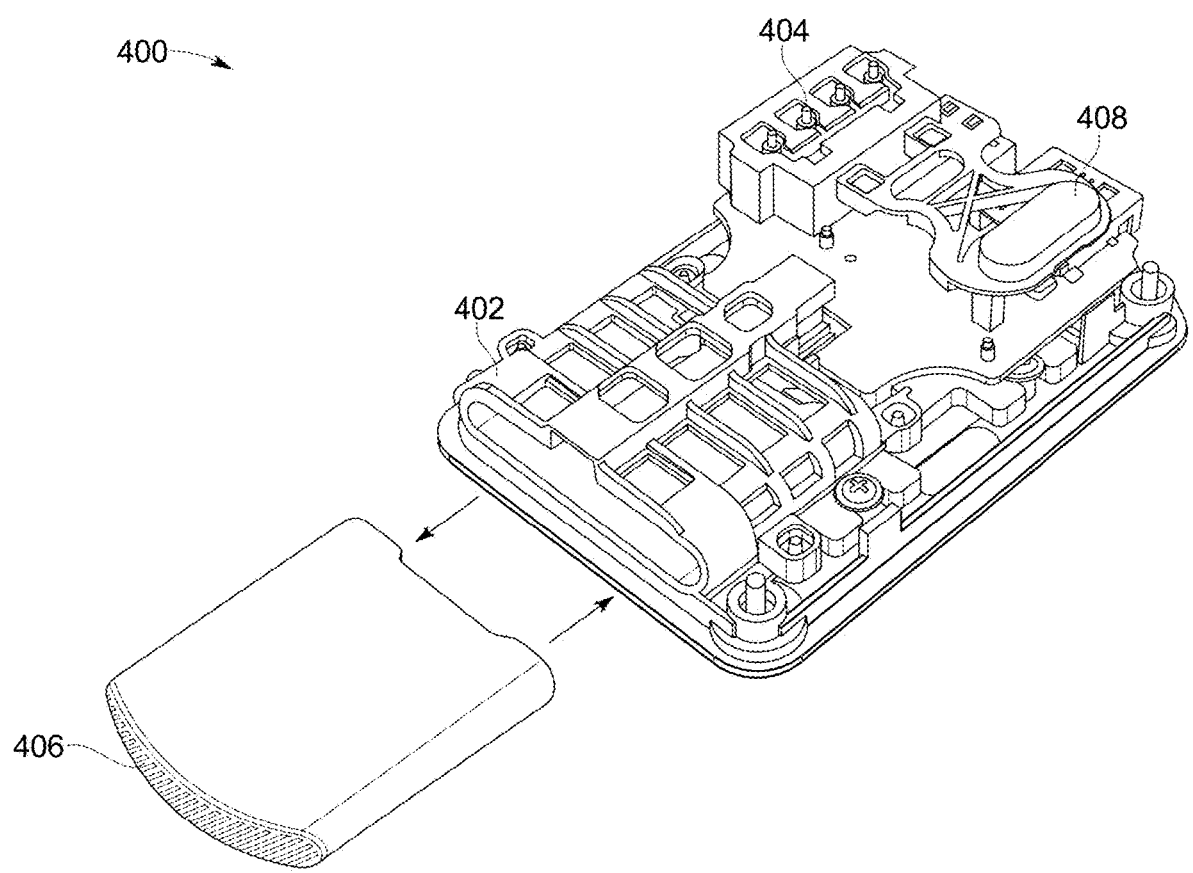
FIG. 4C illustrates a perspective view of an internal portion of the docking station of FIG. 4A with an integrated battery connector assembly, according to an embodiment.

FIG. 4C illustrates a perspective view of the docking station 400 with an integrated battery connector assembly 402. The battery connector assembly 402 may be configured to receive the battery 406 through an opening in the docking station 400. The battery connector assembly 402 may be the same battery connector assembly 200 shown in FIG. 2A and FIG. 2B, utilizing an identical design and components to provide a universal connector interface across the system. This same battery connector assembly is also integrated into the wireless mouse 300 of FIG. 3B as battery connector assembly 302, ensuring complete interchangeability of batteries between the mouse and docking station. The battery connector assembly 402 may include structural features that enable secure connection with the battery 406 while allowing for smooth insertion and removal, including the same structural ribs 202, push-push ejector mechanism 204, electrical contacts 206, and supports 208 as shown in the battery connector assembly 200 of FIG. 2A and FIG. 2B.

In some cases, the docking station 400 may include multiple battery slots, each incorporating a battery connector assembly 402. This configuration may allow for charging multiple removable batteries 106 simultaneously in the docking station 400. The indicator lights 404 may be used to display charge status for each battery, providing users with a clear overview of the charging progress for multiple batteries.

In some cases, the wireless mouse 102 may communicate with a wireless dongle, which may in turn communicate with the docking station 400. This communication chain may enable the display of information about the wireless mouse 102 on the docking station 400. The information displayed may include battery level, DPI settings, and polling rate of the wireless mouse 102.

The wireless dongle may be plugged into one of the I/O ports 410 of the docking station 400. In some cases, this may be a USB-A port specifically designed to accommodate the wireless dongle. The docking station 400 may then process the information received from the wireless dongle and display relevant data using the indicator lights 404. In some aspects, the wireless functionality may be integrated directly into the docking station 400 rather than requiring a separate wireless dongle. This integrated approach may reduce the number of components needed for the system 100 while maintaining full wireless communication capabilities. When the wireless functionality is integrated into the docking station 400, the wireless mouse 102 may communicate directly with the docking station 400 without requiring an intermediary dongle. This direct communication may potentially reduce latency and simplify the overall system architecture while still enabling the display of mouse information through the indicator lights 404.

For example, the battery level of the wireless mouse 102 may be communicated through the wireless dongle to the docking station 400. The docking station 400 may then use one or more of the indicator lights 404 to display this battery level, potentially using different colors or patterns to represent various charge levels. Similarly, when the wireless functionality is integrated directly into the docking station 400 rather than requiring a separate dongle, the docking station 400 can still display the battery level information through the indicator lights 404, maintaining consistent visual feedback regardless of the communication architecture. The battery level information displayed may represent the charge status of the removable battery 106, the keep-alive battery 304, or both batteries simultaneously through different indicators, patterns, or displays. In some implementations, the docking station 400 may be configured to display the charge level of the removable battery 106 during normal operation, and automatically switch to displaying the keep-alive battery 304 status when the removable battery 106 is removed or depleted. This adaptive display approach provides users with relevant power information at all times, ensuring they can monitor both primary and backup power sources as needed.

Similarly, the DPI settings and polling rate of the wireless mouse 102 may be transmitted through this communication chain. The docking station 400 may use dedicated indicator lights 404 or specific lighting patterns to represent these settings, providing users with at-a-glance information about the current configuration of their wireless mouse 102.

This integrated communication system may allow users to monitor the status of their wireless mouse 102 without needing to interact directly with the mouse or check settings on their computer. By centralizing this information on the docking station 400, the system 100 may provide a convenient and efficient way for users to manage their wireless mouse 102 and its associated batteries 106.

In some implementations, the wireless technologies utilized in the hot-swappable wireless mouse battery system 100 may include one or more of Wi-Fi, Bluetooth, Near Field Communication (NFC), or other wireless communication protocols. The wireless dongle and/or the docking station 400 may incorporate corresponding wireless interfaces to support these various protocols. For instance, the docking station 400 may include a Wi-Fi module for high-bandwidth data transfer, a Bluetooth Low Energy (BLE) chip for energy-efficient short-range communication, or an NFC antenna for proximity-based pairing and data exchange. The system 100 may be designed to automatically select the most appropriate wireless protocol based on factors such as range, power consumption, and data transfer requirements. This multi-protocol approach may enhance the versatility and compatibility of the system 100, allowing it to operate effectively in diverse computing environments and with a wide range of devices.

The docking station 400 may utilize a compact form factor that incorporates the battery connector assembly 402 while maintaining a minimal footprint. This design approach may allow the docking station 400 to be placed conveniently on a desk or work surface without occupying excessive space.

The system 100 may be adapted for use with various computer peripherals beyond mice, potentially enhancing the functionality and user experience of devices such as keyboards, headphones, speakers, cameras, and microphones.

In the case of wireless keyboards, for example, the system may allow users to maintain uninterrupted typing sessions. A keyboard may incorporate a battery compartment similar to that of the mouse, allowing for quick replacement of depleted batteries. The keyboard may also include a keep-alive battery to maintain connectivity during battery swaps.

For wireless headphones and speakers, the system may provide extended listening sessions without the need to pause for charging. These audio devices may feature easily accessible battery compartments that allow users to quickly replace depleted batteries with fully charged ones. This system may be particularly beneficial for users who require continuous audio output, such as during long gaming sessions or extended conference calls.

Cameras used for video conferencing or content creation may also benefit from a hot-swappable battery system like that described herein. Users may be able to swap batteries during live streams or extended recording sessions without interrupting their workflow. The camera may incorporate a small keep-alive battery to maintain settings and connectivity during the battery exchange process.

Wireless microphones used in professional settings or for content creation may utilize the system to ensure continuous operation during important recordings or live events. The microphone body may include a discreet battery compartment that allows for quick and quiet battery replacements, minimizing disruptions to audio capture.

In all these applications, the peripherals may be designed to work with a universal battery form factor, allowing users to interchange batteries between different devices. This standardization may simplify battery management and reduce the number of different battery types users need to keep on hand.

The docking station 400 may further be expanded to accommodate multiple peripheral types. A multi-device docking station may feature slots for various battery sizes and types, catering to an ecosystem of hot-swappable battery-powered peripherals. This centralized docking and/or charging solution may help users manage power for all their wireless devices efficiently.

Figure 5:
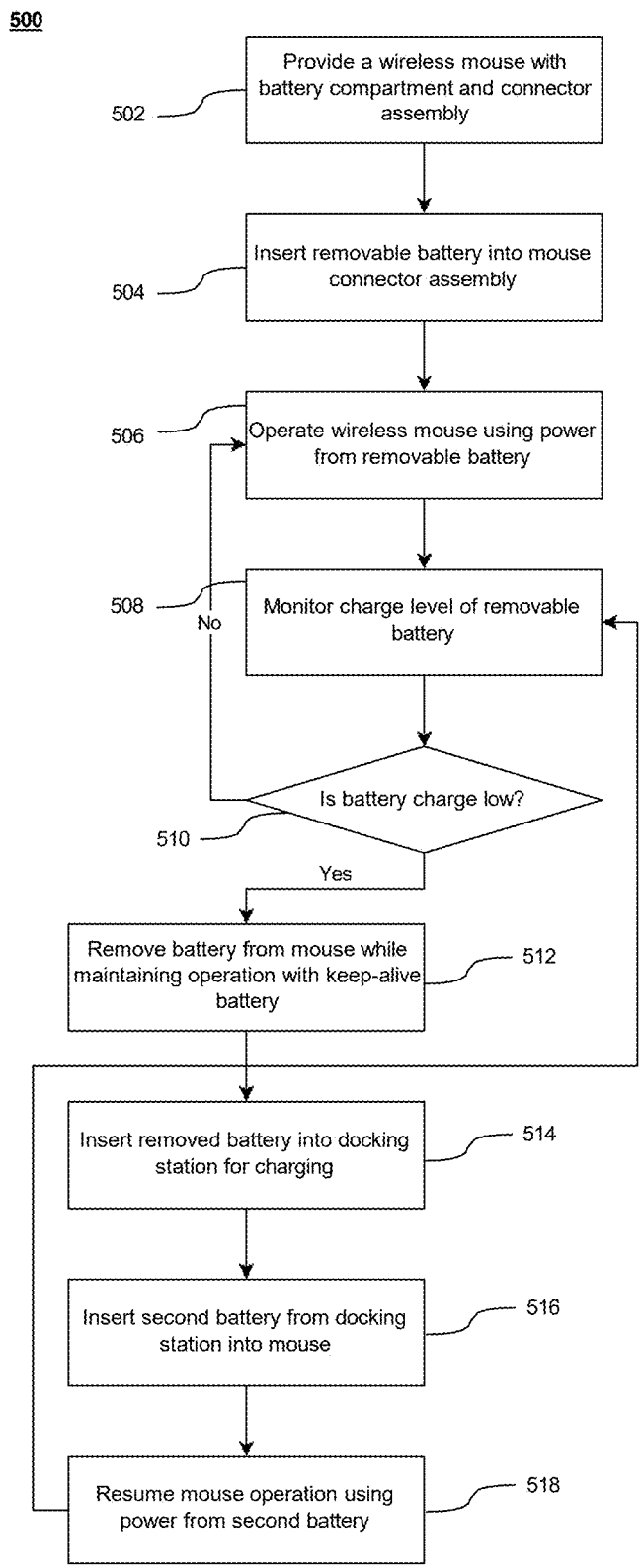
FIG. 5 illustrates a flowchart of a method for operating a hot-swappable battery system, according to aspects of the present disclosure.

FIG. 5 illustrates a flowchart of a method 500 for operating a hot-swappable battery system. The method 500 may begin at step 502, which may involve providing a wireless mouse with a battery compartment and a battery connector assembly. The battery connector assembly may be mounted within the battery compartment of the wireless mouse.

At step 504, a removable battery may be inserted into the battery connector assembly of the wireless mouse. In some cases, the battery connector assembly may include a push-push ejector mechanism, and inserting the removable battery may involve actuating the push-push ejector mechanism. The removable battery may be secured within the battery connector assembly using a plurality of supports positioned along sides of an opening of the assembly.

The method 500 may continue to step 506, where the wireless mouse may operate using power from the removable battery. During this operation, at step 508, a charge level of the removable battery may be monitored.

The method 500 may then proceed to step 510, where a determination may be made regarding whether the battery charge is low. If the battery charge falls below a predetermined threshold, the method 500 may move to step 512. At step 512, the removable battery may be removed from the wireless mouse while maintaining operation of the wireless mouse using power from the keep-alive battery mounted within the wireless mouse. Removing the removable battery may involve actuating the push-push ejector mechanism of the battery connector assembly.

The method 500 may then proceed to step 514, where the removed battery may be inserted into a battery slot of the docking station for charging. At step 516, a second removable battery from the docking station may be inserted into the battery connector assembly of the wireless mouse. In some cases, the battery connector assembly may be configured to accommodate removable batteries of different capacities, and the second removable battery may have a different capacity than the removed battery.

The method 500 may conclude at step 518, where mouse operation may resume using power from the second removable battery. This cycle of battery swapping between the wireless mouse and the docking station may enable continuous mouse operation.

In some cases, the method 500 may include preserving charge of the keep-alive battery when the removable battery is inserted and providing power to the wireless mouse. The method 500 may also include automatically switching to drawing power from the keep-alive battery when the removable battery is removed or when a charge level of the removable battery falls below a predetermined threshold.

The method 500 may further include recharging the keep-alive battery using power from the removable battery when the removable battery is inserted into the battery connector assembly. This may help ensure that the keep-alive battery maintains sufficient charge to power the wireless mouse during battery swaps.

In some cases, the method 500 may include connecting the wireless mouse to the docking station via a wired communication interface. When connected via the wired communication interface, the method 500 may include charging one or both of the removable battery and the keep-alive battery through the wired communication interface.

The general discussion of this disclosure provides a brief, general description of a suitable computing environment in which the embodiments may be implemented. In some cases, any of the disclosed systems, methods, and/or graphical user interfaces may be executed by or implemented by a computing system consistent with or similar to that depicted and/or explained in this disclosure. Although not required, aspects of this disclosure are described in the context of computer-executable instructions, such as routines executed by a data processing device, e.g., a server computer, wireless device, and/or personal computer. Those skilled in the relevant art will appreciate that aspects of the disclosure can be practiced with other communications, data processing, or computer system configurations, including: Internet appliances, hand-held devices, wearable devices, all manner of cellular or mobile phones, dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. Aspects of the disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

The terminology used above may be interpreted in its broadest reasonable manner, even though it is being used in conjunction with a detailed description of certain specific examples of the present disclosure. Indeed, certain terms may even be emphasized above; however, any terminology intended to be interpreted in any restricted manner will be overtly and specifically defined as such in this Detailed Description section. Both the foregoing general description and the detailed description are exemplary and explanatory only and are not restrictive of the features, as claimed.

As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

In this disclosure, relative terms, such as, for example, "about," "substantially," "generally," and "approximately" are used to indicate a possible variation of ±10% in a stated value.

The term "exemplary" is used in the sense of "example" rather than "ideal." As used herein, the singular forms "a," "an," and "the" include plural reference unless the context dictates otherwise.

A number of implementations have been described. Nevertheless, it will be understood that various modifications may be made without departing from the spirit and scope of the disclosure. Accordingly, other implementations are within the scope of the following claims.

The invention claimed is:

1. A hot-swappable battery system for a wireless mouse, comprising:
  a wireless mouse having a battery compartment;
  a battery connector assembly mounted within the battery compartment, the battery connector assembly including electrical contacts and a push-push ejector mechanism;
  a removable battery configured to be inserted into and ejected from the battery connector assembly;
  a keep-alive battery mounted within the wireless mouse and electrically connected to provide backup power when the removable battery is removed; and
  a docking station having a battery slot configured to receive and charge the removable battery when not in use in the wireless mouse;
  wherein the battery connector assembly comprises a plurality of structural ribs and a plurality of support elements, wherein the plurality of support elements are positioned along sides of the opening of the assembly and secure the removable battery when inserted into the assembly.

2. The hot-swappable battery system of claim 1, wherein the keep-alive battery maintains fully functioning and uninterrupted operation of the wireless mouse when the removable battery is removed or depleted.

3. The hot-swappable battery system of claim 2, wherein the removable battery is configured to recharge the keep-alive battery when inserted into the battery compartment.

4. The hot-swappable battery system of claim 1, wherein the wireless mouse includes a power management system configured to:
   preserve charge of the keep-alive battery when the removable battery is inserted and providing power; and
   automatically switch to drawing power from the keep-alive battery when the removable battery is removed or when a charge level of the removable battery falls below a predetermined threshold.

5. The hot-swappable battery system of claim 1, wherein the connector assembly is configured to accommodate removable batteries of different capacities.

6. The hot-swappable battery system of claim 1, wherein the docking station further comprises one or more I/O ports.

7. The hot-swappable battery system of claim 6, wherein the wireless mouse further comprises a wired communication interface, and wherein the wired communication interface is configured to be connected to the one or more I/O ports of the docking station.

8. The hot-swappable battery system of claim 7, wherein when the wireless mouse is connected to the one or more I/O ports of the docking station via the wired communication interface, power may be supplied through the wired connection to charge one or both of the removable battery and the keep-alive battery.

9. The hot-swappable battery system of claim 1, wherein the docking station further comprises a plurality of indicator lights positioned on a top surface to display status information.

10. A method for using a hot-swappable battery system, comprising:
   providing a wireless mouse with a battery compartment and a battery connector assembly mounted within the battery compartment, wherein the battery connector assembly comprises a plurality of structural ribs and a plurality of support elements, wherein the plurality of support elements are positioned along sides of the opening of the battery connector assembly and secure a removable battery when inserted into the assembly;
   inserting the removable battery into the battery connector assembly of the wireless mouse;
   operating the wireless mouse using power from the removable battery; monitoring a charge level of the removable battery;
   removing the removable battery from the wireless mouse while maintaining operation of the wireless mouse using power from a keep-alive battery mounted within the wireless mouse;
   inserting the removed battery into a battery slot of a docking station; charging the removed battery in the docking station;
   inserting a second removable battery from the docking station into the battery connector assembly of the wireless mouse; and
   resuming operation of the wireless mouse using power from the second removable battery.

11. The method of claim 10, wherein the battery connector assembly includes a push-push ejector mechanism, and wherein removing the removable battery comprises actuating the push-push ejector mechanism.

12. The method of claim 10, further comprising:
   preserving charge of the keep-alive battery when the removable battery is inserted and providing power to the wireless mouse; and
   automatically switching to drawing power from the keep-alive battery when the removable battery is removed or when a charge level of the removable battery falls below a predetermined threshold.

13. The method of claim 10, further comprising recharging the keep-alive battery using power from the removable battery when the removable battery is inserted into the battery connector assembly.

14. The method of claim 10, wherein the docking station includes a plurality of indicator lights, and further comprising displaying status information related to the charging of at least one of the removed battery, the second removable battery, and the keep-alive battery using the indicator lights.

15. The method of claim 10, further comprising connecting the wireless mouse to the docking station via a wired communication interface.

16. The method of claim 15, further comprising charging one or both of the removable battery and the keep-alive battery through the wired communication interface when the wireless mouse is connected to the docking station.

17. The method of claim 10, wherein the battery connector assembly is configured to accommodate removable batteries of different capacities, and wherein the second removable battery has a different capacity than the removed battery.

18. The method of claim 10, wherein the docking station includes multiple battery slots, and wherein the method further comprises:
   charging multiple removable batteries simultaneously in the docking station; and
   displaying charge status for each battery using the indicator lights.

* * * * *